US006214283B1

(12) United States Patent
Visscher et al.

(10) Patent No.: US 6,214,283 B1
(45) Date of Patent: Apr. 10, 2001

(54) METHOD FOR TREATING AN EXTRUDED PLASTIC SECTION AND EXTRUSION INSTALLATION THEREFOR

(75) Inventors: Jan Visscher, Lutten; Jan Hendrik Prenger, Hardenberg; Johan Schuurman, Dedemsvaart, all of (NL)

(73) Assignee: Wavin B.V. (NL)

( * ) Notice: Subject to any disclaimer, the term of this patent is extended or adjusted under 35 U.S.C. 154(b) by 0 days.

(21) Appl. No.: 08/945,590

(22) Filed: Oct. 29, 1997

Related U.S. Application Data

(63) Continuation of application No. PCT/NL96/00189, filed on May 2, 1996.

(30) Foreign Application Priority Data

May 3, 1995 (WO) .................................. PCT/NL95/00160
Sep. 21, 1995 (NL) .................................................... 1001259

(51) Int. Cl.[7] .................................................. B29C 35/16
(52) U.S. Cl. .......................... 264/558; 264/560; 264/561; 264/563; 264/237; 264/348; 425/326.1; 425/393; 425/404
(58) Field of Search .................................... 264/558, 560, 264/561, 563, 237, 348, 37.17, 37.26; 425/326.1, 393, 404

(56) References Cited

U.S. PATENT DOCUMENTS

| 3,274,314 | 9/1966 | Hudson et al. . |
| 3,522,337 | * 7/1970 | Ball ........................................ 264/558 |
| 3,784,345 | * 1/1974 | Wissinger et al. .................... 425/325 |
| 3,907,961 | * 9/1975 | Carrow .................................. 264/314 |
| 3,990,828 | 11/1976 | Reifenhauser . |
| 4,526,526 | 7/1985 | Krogh . |
| 4,663,107 | * 5/1987 | Takada et al. ........................ 264/519 |
| 4,708,841 | * 11/1987 | Larsen .................................... 264/558 |
| 5,096,634 | * 3/1992 | Tsadares et al. ..................... 264/40.2 |
| 5,449,487 | * 9/1995 | Jarvenkyla ............................. 264/508 |

FOREIGN PATENT DOCUMENTS

| 1 011 513 | 7/1977 | (CA) . |
| 41 29 881 A1 | 4/1993 | (DE) . |
| 0 165 068 | 12/1985 | (EP) . |
| 0 454 997 A3 | 11/1991 | (EP) . |
| 2 168 476 | 8/1973 | (FR) . |
| 2 312 355 | 12/1976 | (FR) . |
| 58-128823 | 8/1983 | (JP) . |

OTHER PUBLICATIONS

International Search Report dated Jul. 20, 1995.
International Search Report dated Jul. 16, 1996.

* cited by examiner

Primary Examiner—Jan H Silbaugh
Assistant Examiner—Stefan Staicovici
(74) Attorney, Agent, or Firm—Blank Rome Comisky & McCauley LLP

(57) ABSTRACT

Method for treating an extruded plastic section having a hollow space and installation suitable for carrying out such a treatment. The installation includes an extruder which has a core for forming the hollow space in the section and, at a distance downstream from the extruder in the extrusion direction of the section, a closing means having a rigid circumferential wall. The installation also has a first conduit connected to a supply orifice which is provided in the circumferential wall of the closing means, a fluid feeder connected to the first conduit and a second conduit connected to a discharge orifice. The discharge orifice is upstream of the supply orifice to provide a fluid film flowing opposite to the extrusion direction between the circumferential wall of the closing means and the extruded section.

11 Claims, 5 Drawing Sheets

METHOD FOR TREATING AN EXTRUDED PLASTIC SECTION AND EXTRUSION INSTALLATION THEREFOR

This is a Continuation of PCT Application No. PCT/NL96/00189, filed May 2, 1996, which claims priority of PCT Application No. PCT/NL95/00160, filed May 3, 1995, which claims priority of The Netherlands Application No. 1001259, filed Sep. 21, 1995.

FIELD OF THE INVENTION

The present invention relates to the treatment of an extruded plastic section which emerges from an extrusion apparatus.

BACKGROUND OF THE INVENTION

In the Dutch patent application NL 7612518 an installation for manufacturing an extruded plastic section is disclosed wherein the extruded tubular section is cooled not only externally, which is the most common cooling method, but there is also internal cooling with cooling water which comes directly into contact with the inside of the plastic section to be cooled. As a result of said additional internal cooling, cool-down of the section can be improved and, at the same time, the length of the cooling section can be considerably shorter, theoretically by a factor of four, than if external cooling only were to be employed.

In the case of the known installation, for the purpose of internal cooling with cooling water, a sealed compartment is bounded by the insulated end face of the internal mandrel of the extruder on the one hand, and a closing means which is situated at a distance downstream therefrom in the extrusion direction on the other hand. The closing means, in the case of the known installation, is a cylindrical metal stopper which, via a hollow anchor rod, is fixed to the mandrel of the extruder. The external diameter of the stopper is such that the plastic section, which is cooling down and therefore shrinking, slides with friction along the rigid outer wall of the stopper. In the process, the contact pressure between the stopper and the plastic section brings about the fluid seal intended for the purpose of sealing the compartment, this being assisted by a plurality of circumferential grooves in the stopper, which provide the effect of a labyrinth seal. Through the hollow anchor rod cooling water can be introduced, upstream of the closing means, into the sealed compartment, said cooling water then flowing in a counter-current direction along the plastic profile to be cooled and then being discharged via the mandrel of the extruder.

The method and installation disclosed by NL 7612518 has not proved satisfactory in practice, particularly with respect to the closing means employed there. The seal obtained with said known closing means cannot be controlled in practice, as a result of which there will occur either undesirable leakage or precisely the problem of the plastic section lying with such force against the rigid circumferential wall of the stopper that as a result of the large frictional forces then produced damage is caused to the plastic section and the mounting of the stopper is subjected to undesirably large (tensile) loads.

For the abovementioned reasons, the purpose of effecting internal cooling has until now been served by preferably employing flexible closing means, for example as described in DE 25 06 517. In the case of the closing means shown in said publication, the outer wall of the closing means is made of a flexible material, and the pressure with which the flexible outer wall lies against the section to be cooled can be controlled. Since extrusion installations are in practice operated continuously, the inevitable result, inter alia under the influence of the prevailing temperatures and pressures and the frictional contact with the extruded section, is wear of the flexible wall of the closing means, which necessitates regular replacement thereof, for which purpose the extrusion installation has to be shut down.

OBJECT OF THE INVENTION

The object of the present invention is to provide a method and an extrusion installation for fabricating an extruded plastic section, which permit improved sealing of the compartment in the hollow space of the section, as a result of which it is possible to subject the plastic section at will, even during the production thereof, to one or more internal treatments.

SUMMARY OF THE INVENTION

This object is achieved by a method according to claim 1 and an extrusion installation according to claim 12. Just as has been shown in NL 7612518, the rigid outer wall of the closing means preferably has such dimensions that in the absence of the fluid film according to the invention a frictional contact would exist at that location between the closing means and the plastic section. Since according to the present invention there is produced, at least over a portion of the outer wall of the closing means, a film of fluid, i.e. an incompressible or barely compressible medium, between the closing means and the section, the frictional forces are considerably reduced. The present invention further provides for the fluid in the film to flow in a counter-current direction, i.e. counter to the extrusion direction of the plastic section, over the surface of the outer wall of the closing means. This measure is based on the insight that the plastic section, which emerges from the extruder and is cooling down, will want to lie against the outer wall of the closing means with greater and greater force. By the fluid forming a film being fed in at the downstream end of the film, the supply of fluid at that location, by means of suitable feeding means, is utilized to prevent the at least one supply orifice from being closed by the plastic section. The plastic section, during normal operation of the installation, will lie directly, downstream of the at least one supply orifice, against the circumferential wall of the closing means and as a result form a fluid seal. Said lying against can be promoted by the plastic section being further cooled at the location of the closing means, this being effected, for example, by the closing means itself being cooled and/or by the fluid which forms the film being employed as a coolant.

As a result of the low friction obtained, according to the present invention, between the closing means and the plastic section, damage to the plastic section is avoided, the wear of the closing means is low, and the force exerted by the closing means on its mounting is also considerably smaller than in the case of the installation disclosed by NL 7612518. A further advantage of the inventive thought is that a very smooth surface of the wall of the hollow space in the plastic section is obtained.

The method and extrusion installation according to the present invention are also applicable, very advantageously, in cases where the closing means serves as an expansion mandrel and has such a shape, for example with a cross-section which conically increases in the extrusion direction, that the plastic section moving over the closing means fashioned as an expansion mandrel is expanded in the circumferential direction. Said purposeful expansion of the extruded plastic section is employed, in particular, in the fabrication of biaxially oriented tubing made of thermoplastic material. In this situation, too, by means of the closing means according to the invention, a considerable reduction of the frictional forces between plastic section, on the one hand, and closing means, the expansion mandrel, on the other hand, is obtained with respect to installations known hitherto, having an expansion mandrel with a rigid outer wall.

BRIEF DESCRIPTION OF THE DRAWING

Further advantageous embodiments of the invention are described in the claims and the following description, in which the invention will be described in more detail with reference to illustrative embodiments, represented in the drawing, of the installation according to the invention, in which:

DETAILED DESCRIPTION OF THE INVENTION

Figure 1:
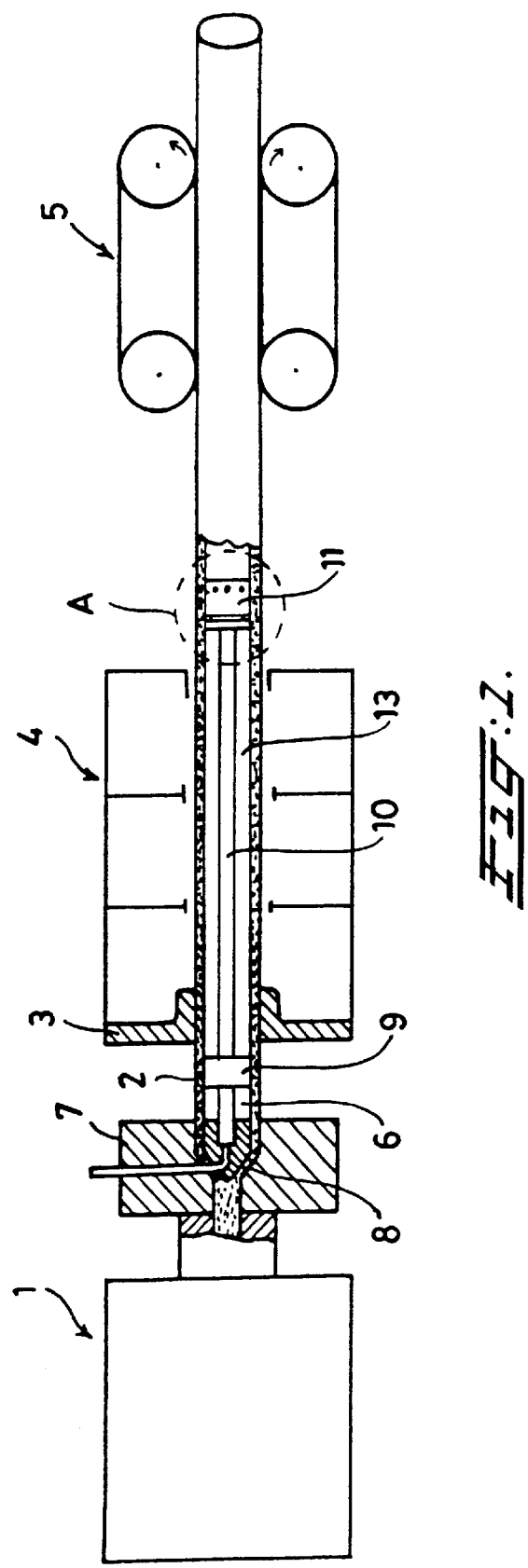
FIG. 1 shows, schematically, a first illustrative embodiment of the extrusion installation according to the invention.

The extrusion installation represented in FIG. 1 comprises an extruder 1, for extruding, in this example, a cylindrical tube section 2 made of thermoplastic material, a sizing apparatus 3, positioned downstream, in the extrusion direction (arrow C), of the extruder 1, for the external diameter of the tube section 2, an external cooling apparatus 4 for cooling the extruded section 2 from the outside, and a customary pulling device 5.

Within the scope of the following description, the terms "downstream" and "upstream" indicate, respectively, the direction of motion of the extruded plastic section and the direction opposite thereto.

The external cooling apparatus 4 may, as schematically indicated in FIG. 1, comprise a plurality of successive segments, the cooling effect being separately controllable in each segment.

For the purpose of forming a hollow space 6, cylindrical in this case, in the plastic section 2, the extruder 1 is provided with an extruder head 7 having a mandrel 8.

For the purpose of cooling the section 2, which emerges from the extruder 1 at a high temperature, provision is made, in addition to external cooling by means of the external cooling apparatus 4, for cooling of the section 2 from the inside. To this end, the hollow space 6 of the section 2 is closed, downstream of the extruder 1, with the aid of a first closing means 9, here indicated schematically, which is fixed to the core 8 of the extruder 1 via an anchor rod 10. The first closing means 9 may, for example, comprise a dimensionally rigid disc body which locally stretches the cross-section of the soft tube section 2 or a seal having flexible flaps of silicone rubber.

For the purpose of internal cooling of the plastic section 2, a second closing means 11 is provided at a distance downstream from the first closing means 9. The second closing means 11 likewise closes the hollow space 6 of the section 2 and is likewise attached to the pull rod 10. The first and the second closing means, 9 and 11 respectively, between one another delimit a sealed compartment 13.

The extrusion installation further comprises means not shown in detail, inter alia conduit means through the extruder head 6, the mandrel 8 and the anchor rod 10, in order to effect circulation of cooling fluid, for example water, through the compartment 13 during operation of the extrusion installation. In the process, the cooling fluid supplied, preferably near the downstream end of the compartment 13, comes into direct contact with the wall of the section 2 which bounds the hollow space 6, and in the process flows in a counter-current direction, i.e. counter to the extrusion direction of the section 2, towards a discharge situated near the upstream end of the compartment 13. As a result of such internal cooling of the extruded tube section 2 being provided, the length required for the cooling section becomes considerably smaller than if external cooling only were to be employed; the theoretically possible reduction can even amount to a factor of four, said reduction being virtually achievable in practice by means of the installation according to the invention. It is further possible, thanks to the internal cooling of the tube section 2, to obtain advantageous cooling of the plastic material of the section 2.

Owing to the cooling fluid flowing through the compartment 13 in a counter-current direction, the effect is achieved of the cooling fluid gradually warming up in the direction of the extruder 1, so that the section 2 comes into contact with warmer cooling fluid at the upstream end of the compartment 13 than at the downstream end of said compartment 13. This is advantageous because the section 2 itself cools down further and further in the extrusion direction as seen along the compartment 13, as a result of which the temperature of the cooling fluid is within an advantageous range with respect to the temperature of the tube section 2 to be cooled.

Clearly, the closing means 9 and 11 must be capable of preventing the cooling fluid from leaking away from the compartment 13. To this end, the present invention provides a special design of the closing means 11, which design will now be illustrated in more detail with reference to the detailed representation in FIG. 2. For that matter, the first closing means 9 can likewise be constructed in the way described hereinafter for the second closing means 11.

Figure 2:
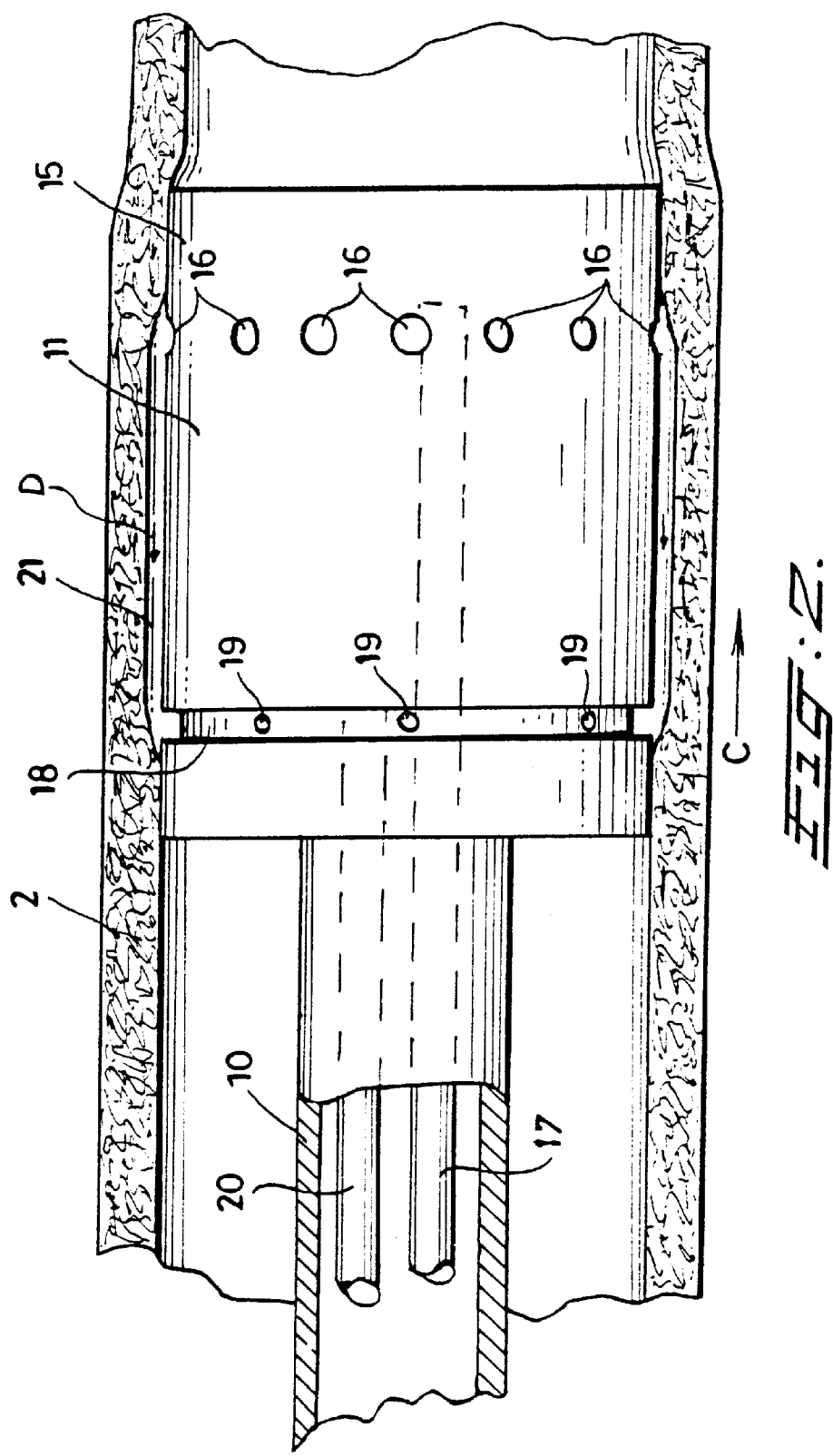
FIG. 2 shows detail A in FIG. 1 on a larger scale.

In FIG. 2, the extruded plastic tube section 2 can be seen in longitudinal section, said section 2 moving in the extrusion direction indicated by arrow C. Also to be seen are the anchor rod 10, constructed as a hollow metal tube, and the closing means 11 attached thereto. The closing means 11 has an outer wall 15, which is rigid and nondeformable under the influence of the normally occurring forces, for example made of metal. In this case, the outer wall 15 is shaped as a result of the closing means 11 being a solid metal cylinder.

As can be seen in FIG. 2, the outer wall 15 of the closing means 11 has an external diameter which is such that the plastic section 2 will want to be in frictional motion along said outer wall 15. It is precisely by the contact pressure between the section 2 and the closing means 11 that the intended sealing of the compartment 13 is obtained. The contact pressure between the two then depends on the external diameter of the closing means 11 and the internal diameter of the section 2. What is desirable in order to obtain the intended fluid seal is therefore, in each case, a firm fit of the section 2 against the outer wall 15 on an annular circumferential area of the outer wall 15 of the closing means 11.

According to the present invention, the closing means 11 is provided with at least one supply orifice 16 which is situated in the outer wall 15, situated along the section 2, of the closing means 11. In this case, a plurality of supply orifices 16 are provided, distributed regularly around the outer wall, at a distance from the downstream end of the closing means 11. The supply orifices 16 are situated in an annular groove, slightly recessed, around the outer wall 15 of the closing means 11 and communicate with a supply line 17. Said supply line 17 runs from the closing means 11 through the anchor rod 10, the mandrel 8 of the extruder 1 (see FIG. 1) to fluid feeder means (not shown). At a distance upstream of the supply orifices 16 the closing means 11 is provided with at least one discharge orifice 19, in this case an annular groove 18 which extends around the circumference of the outer wall 15. The annular groove 18 communicates with a discharge line 20 via one or more cylindrical holes 19 in the closing means 11. The discharge line 20 runs from the closing means 11, through the anchor rod 10, the mandrel 8 of the extruder 1, back to the fluid feeder means (not shown).

Incorporated in the fluid feeder means there is a pumping apparatus in order to effect the feeding of fluid to the supply orifices 16 in the outer wall 15 of the closing means 11. The fluid fed in then arrives between the closing means 11 and the tube section 2 and thence flows in an upstream direction (arrow D) to the groove 18. The infeed of fluid is controlled in such a way that the fluid in the area approximately between the supply orifices 16 and the groove 18 forms a film 21 of fluid, said film 21 keeping the section 2 at a very small distance, strongly exaggerated in FIG. 2, from the outer wall 15 of the closing means 11. The fluid film 21 is separated from the compartment 13 as a result of the fact that the section 2, in the area between the groove 18 and the upstream end of the closing means 11, will lie against the closing means 11. In the area between the supply orifices 16 and the downstream end of the closing means 11 the section 2 will likewise lie against the outer wall 15 of the closing means 11. Because of the steadily progressing cool-down of the section 2 in the extrusion direction, the decrease of the influence of any pressure in the compartment 13, and preferably assisted by a further gradual cool-down of the section 2 at the location of the closing means 11, the section 2 will have a greater tendency to press itself against the outer wall downstream of the supply orifices 16 than upstream thereof. Indeed, this is the reason why the fluid film 21 depicted is established and is maintained as long as the fluid forming a film is fed in. If required, the first formation of the fluid film 21 may be promoted by fashioning recessed portions in the outer wall 15 of the closing means 11, which extend between the supply orifices 16 and the discharge groove 18.

For the purpose of further cool-down of the section 2 at the position of the closing means 11 it is possible to employ the fluid fed in via supply line 17, if a sufficiently low temperature of the fluid is chosen.

Of great importance for the reliability of the fluid seal, obtained with the aid of the closing means 11, of the compartment 13 and for the quality of the plastic tube section ultimately obtained is the stability of the fluid film 21. To this end, the invention provides for the fluid feeder means, which feed the fluid to the supply orifices 16, to be designed for said fluid to be fed in with a pressure-independent flow rate. This is because the plastic section 2 has the tendency to come to lie against the outer wall 15 of the closing means 11 and consequently to close the supply orifices 16 entirely or in part and thus to form a continuously varying flow resistance for the fluid. As a result of use being made of fluid feeding means which are able to feed the fluid forming a film to the supply orifices 16 with an adjustable but especially a pressure-independent flow rate, instability of the fluid film 21 is largely avoided. It was found that, once a suitable flow rate has been determined and thus been set for a particular type of plastic section, no further control is necessary during operation of the extrusion installation to maintain a stable fluid film.

Figure 3:
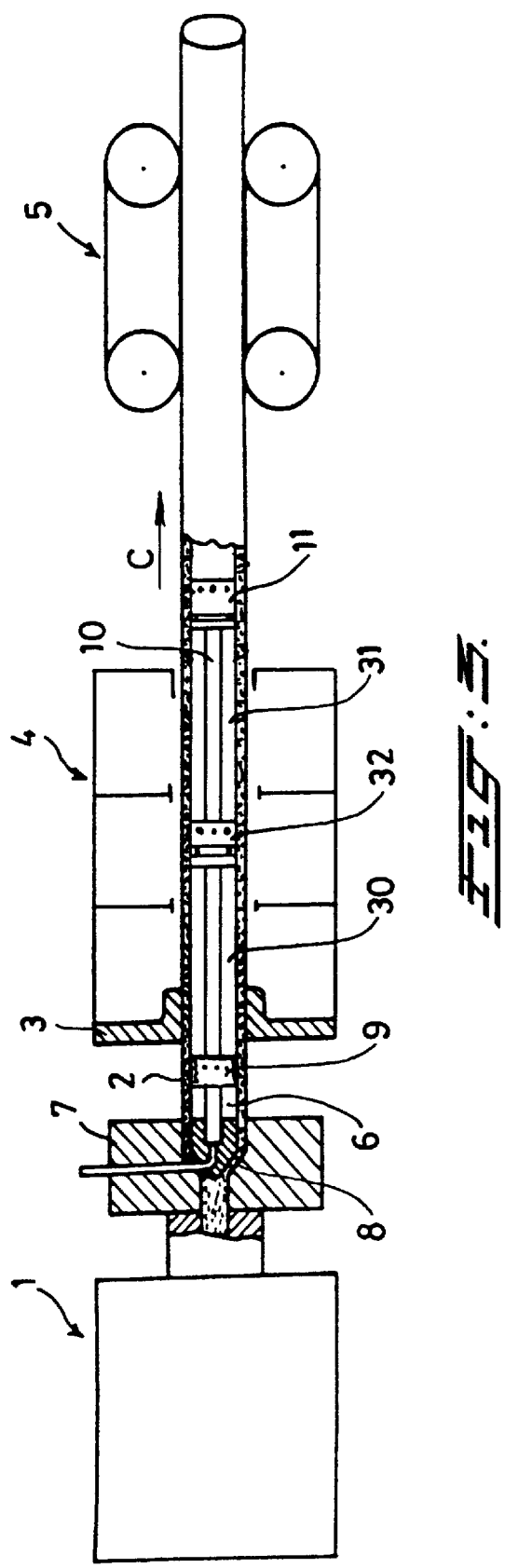
FIG. 3 shows, schematically, a second illustrative embodiment of the extrusion installation according to the invention.

FIG. 3 represents essentially the same extrusion installation as has been explained with reference to FIG. 1, for which reason the same components have been indicated by the same reference numerals. An important difference, however, is that two sealed compartments 30 and 31, separated from one another, have been formed in the hollow space 6 of the plastic section 2. To this end, approximately halfway between the first closing means 9 and the second closing means 11 a third closing means 32 has been fitted on the anchor rod 10. The third closing means 32 is substantially identical to the second closing means 11 described with reference to FIG. 2.

For the purpose of feeding in and discharging the fluid which, at the position of the third closing means 32, forms a film between the third closing means 32 and the section 2, separate means are provided as for the second closing means 11. Likewise, separate means are provided for each of the compartments 30 and 31, for the purpose of adjusting and maintaining a circulation of a section treatment medium through the compartment in question. This embodiment makes it possible to subject the inside of the section 2 to two successive treatments. Thus it is possible to cause cooling fluid to circulate in each compartment 30 and 31, preferably in a counter-current direction, the cooling fluid supplied to the compartment 30 being warmer than the cooling fluid which is supplied to the compartment 31 situated downstream thereof.

The combination of external cooling and internal cooling of the section 2 requires accurate control of the cooling effect in order to prevent the formation, between an outer layer and an inner layer of the section 2 which have already been cooled down too far, of an intermediate layer which, in terms of its volume, has to shrink yet further. At that moment shrinkage cavities are formed in said intermediate layer, which may lead to inferior quality of the entire plastic section 2.

With the aid of the installation according to FIG. 3 it is possible to effect gradual cooling of the section 2 on the inside.

A problem which may occur with the proposed method of internal cooling involving a sealed compartment which contains cooling fluid is that colder fluid will be situated in the lower part of the compartment than in the upper part of the compartment. As a result, uneven cool-down of the plastic section to be cooled might be obtained. This disadvantageous effect can be counteracted by positioning helix-forming means in the compartment, preferably attached to the anchor rod, which will cause the cooling fluid to circulate helically through the compartment along the section to be cooled. Another possibility is for a sleeve made of a material with good thermal conductivity to be placed in the compartment, for example an aluminium sleeve, any temperature difference of the cooling fluid in the compartment being smoothed as a result.

A further application makes provision for the section wall which bounds the hollow space to be treated chemically in one or more sealed compartments formed by closing means, for example by, in the case of the installation according to FIG. 3, causing a suitable chemical fluid to circulate in one of the two or both compartments 30 and 31. By, for example, bringing a fluid of a suitably chosen degree of acidity into contact with the extruded section 2 it is advantageously possible to effect, even during the production of the section 2, an emission of metal from the plastic material of the section 2. This is advantageous since said metal emission otherwise takes place during an initial period of use of the tube section 2 as a (drinking) water pipe.

For tube sections which are employed as a water pipe it is also possible, advantageously, to feed highly pure water to one or both compartments 30 or 31. What is achieved by means of the highly pure water is that the undesirable taste usually given off with certain plastic materials such as PE during an initial period of use as a water pipe is greatly reduced or even avoided.

It is also possible for the fluid which is brought into contact with the extruded section in one or more sealed compartments to be used for cross-linking the plastic material of the section, which may be desirable to enhance the temperature stability of the extruded section.

It will be evident that instead of two compartments, as depicted in FIG. 3, it is also possible to form yet more sealed compartments in the hollow space of the section by positioning yet more closing means in series with one another. In this context it is very advantageous for the compartments to be produced by means of closing means which bring about a fluid film, which flows counter to the extrusion direction, between them and the plastic section, for example as described with reference to FIG. 2. The reduction, achieved by this measure, in the frictional forces between each closing means and the extruded section moving past makes it possible for a plurality of such closing means to be positioned in series with one another without the anchorage of the closing means being subjected to excessive loads and without damage to or undesirable influences on the plastic section by the friction occurring. The loading on the anchorage of the closing means are fitted is important, in particular, if the anchor rod on which the closing means are fitted (such as anchor rod 10 in FIG. 3) is fixed to the mandrel of the extruder, since the attachment of the mandrel to the extruder head is preferably carried out by means of thin spokes which disturb the flow of the molten plastic material as little as possible.

Instead of supplying a fluid to one or more compartments for the purpose of treating the plastic section it is of course also possible for a gas to be brought into contact, at the location of one or more compartments, with the plastic section.

Figure 4:
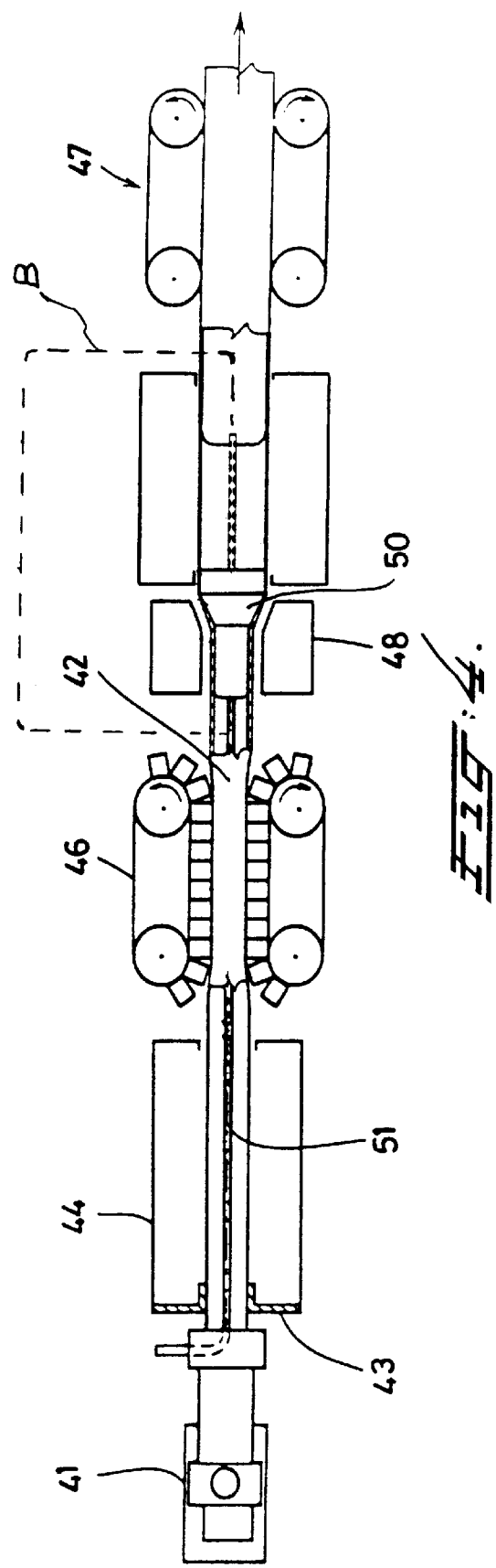
FIG. 4 shows, schematically, a third illustrative embodiment of the extrusion installation according to the invention.

FIG. 4 shows another application of the inventive thought, a tube section of thermoplastic material (such as polyvinyl chloride or polyethylene) with a smooth cylindrical wall being fabricated. It will be evident that the inventive thought and solutions can also be used for the fabrication of sections having a different cross-section, if necessary by adjusting the design of the components described hereinafter.

FIG. 4 shows an extruder 41 which is used to fabricate, in a continuous process, a hollow tube 42 made of a thermoplastic material. When leaving the extruder 41, the tube 42 has a round annular initial cross-section.

The tube 42 leaving the extruder 41 moves through an external sizing sleeve 43 and then passes through a cooling means 44, in this case a water cooling means.

The tube 42 is oriented biaxially by forcing the tube 42, at a suitable temperature of the plastic material of the tube 42, over a mandrel 50 which is kept in place by a pulling member 51 which runs through the hollow tube 42 and is linked to the extruder 41.

In practice, the orientation temperature is the temperature at which the plastic material becomes dimensionally stable when it cools down. For polyvinyl chloride the orientation temperature is in a range just above the glass transition temperature of polyvinylchloride. Polyethylene and other polyolefins do not have a transition temperature, but an "alpha phase", which indicates the transition from a crystalline via a partially crystalline to an amorphous structure. The orientation temperature of such a plastic material is just above the temperature range associated with the "alpha phase".

The expansion mandrel 50 will be explained hereinafter in more detail with reference to FIG. 5.

For the purpose of controlling the speed at which the tube 42 moves towards the mandrel 50 a tube speed control device 46 is present at a distance upstream of the upstream end of the mandrel 50, seen in the direction of motion of the tube 42, said device 46 here engaging the outside of the tube 42.

Downstream of the mandrel 50, a pulling device 47 is present for the purpose of exerting an axial tensile force on the tube 42. Said pulling device 47 may be of a type generally known from the prior art.

In the case of the installation described with reference to FIG. 4, the outside of the tube 42 is cooled, upstream of the device 46, by the cooling means 44, in such a way that the plastic material, in a layer adjoining the outside of the tube 42, is brought to a temperature which is distinctly lower than the orientation temperature of the plastic material. This ensures that the wall of the tube 42 acquires a cold and consequently relatively firm and hard outer layer of a suitable thickness, so that said outer layer can withstand the mechanical influences exerted by the device 46 engaging on the tube 42.

For a plastic material such as polyvinylchloride whose glass transition temperature is in the range of from approximately 80° C. to 85° C. it has been found that cool-down on the outside of the tube 42 to approximately 70° C. is sufficient to achieve a sufficiently thick and strong outer layer. The temperature of the outer layer thus defined is then, in the case of polyvinylchloride, between 80° C. on the inside and 70° C. on the outside of the outer layer.

Because of the gap between the device 46 and the mandrel 50, a period of time is available for effecting warm-up of the outer layer to the desired orientation temperature. During the time when the tube 42 moves from the device 46 to the mandrel 50, the material which is enclosed by the outer layer and which is at a higher temperature than the outer layer gradually gives off some of its heat to the colder outer layer. As a result, the outer layer gradually becomes thinner if the outside of the tube 42 is no longer cooled from outside. Ultimately, said warming up may lead to the disappearance of the outer layer.

The temperature of the innermost portion of the tube wall is preferably controlled in such a way, for example by internal cooling/heating of the tube 42, that at the instant when the tube 42 leaves the device 46 the temperature of that portion is above the orientation temperature. If the heat of said innermost portion of the tube is gradually given off to the outer layer, the innermost portion cools down towards the orientation temperature. This transfer of heat from the inside to the outside means that the tube, including the outer layer, is at the orientation temperature desired for biaxial orientation.

On the basis of the abovementioned automatic warming up of the outer layer of the tube 42 it is not always possible to guarantee that a uniform orientation temperature will be achieved. Preference is therefore given to the provision of a heating means 48. Said means 48 is designed to influence the temperature of the tube 42 sector by sector in the circumferential direction, for example by the heating means comprising a plurality of infrared heating units which near the mandrel 50 are positioned at regular intervals around the trajectory along which the tube 42 moves through the installation.

Figure 5:
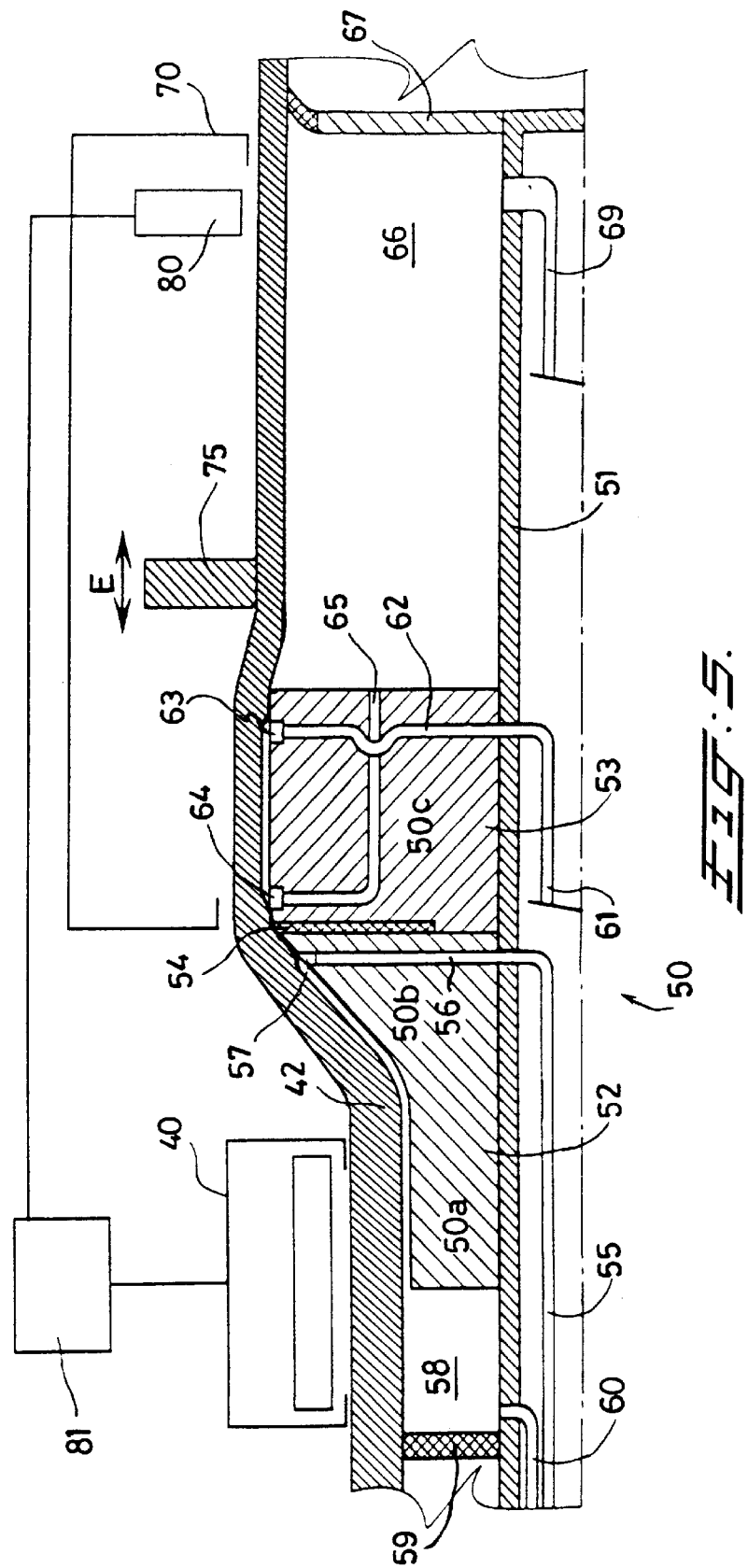
FIG. 5 shows detail B in FIG. 4 on a larger scale.

In FIG. 5 it can be seen that the mandrel 50 is attached, with the anchor member 51, to the extruder (not shown here). The mandrel 50 essentially consists of two sections; a heated section 52 which comprises an essentially cylindrical take-up portion 50a and a conical expansion section 50b, and a cooled section 53 which comprises an essentially cylindrical take-off portion 5oc.

An annular disc 54 made of thermally insulating material such as a plastic is positioned between the heated section 52 and the cooled section 53 of the mandrel 50.

A warm fluid, for example warm water, is fed through a conduit 55 in the anchor member 51 to one or more ducts 56 which are provided in the essentially solid metal mandrel section 52. Each duct 56 ends in a recessed circumferential groove 57 which is disposed in the outermost conical surface of the mandrel section 52. The fluid fed in through the line 55 forms a layer between the tube 42 and the heated mandrel section 52 of the mandrel 50 and, from said groove 57, will flow counter to the direction of movement of the tube 42. The warm fluid then reaches an annular chamber 58 which is defined by a sealing means 59, the tube 42 and the mandrel section 52. The fluid leaves the space 58 via a subsequent line 60 which is provided in the anchor member 51. The warm fluid will not flow in the same direction as the moving tube 42, since an effective fluid seal is provided by the contact pressure between the tube 42 and the mandrel 50 downstream of the groove 57 in the area of the transition from the conical section 52 to the take-off portion 53 of the mandrel 50.

In the case of the biaxial orientation of a tube made of polyvinyl chloride the preferred temperature of the warm fluid fed in is approximately 95° C., the pressure preferably being no greater than is necessary to form and to maintain the fluid layer between the tube 42 and the heated section 52.

A cold fluid, for example cold water, is fed through a line 61 in the anchor member 51 to one or more ducts 62 which are provided in the essentially solid metal mandrel section 53. Each duct 62 opens into a recessed circumferential groove 63 which is disposed in the outer surface of section 53. From said groove 63 the fluid will flow, counter to the direction of motion of the tube 42, to a second circumferential groove 64 which is disposed in the outer surface of the mandrel section 53 and thence flows via one or more ducts 65 to a chamber 66 downstream of the mandrel 50. This provides a layer of fluid between the cooled section 53 of the mandrel 50 and the tube 42. The chamber 66 is defined by a sealing means 67, the portion of the pulling member 51 which extends downstream of the mandrel 50, and the mandrel section 53. The fluid which flows into the chamber 66 will leave said chamber 66 via a line 69 which is provided in pulling member 51.

The groove 63 is at such a distance from the downstream end of the mandrel section 53 that an effective fluid seal is achieved by the contact pressure between the tube 42 and the mandrel section 53. Said pressure is mainly the result of the tendency of the tube 42 to shrink when the tube is cooled.

The stream of the cold fluid between the take-off section 53 of the mandrel 50 and the tube 42 directly cools the tube 42 from the inside, after the radial expansion of the tube 42 has been effected. In the case of the biaxial orientation of PVC the temperature of the cold fluid is, for example, approximately 20° C. when this is fed to the line 61.

It should be noted that the thickness of the fluid layers between the tube 42 and the sections 52 and 53 of the mandrel 50 is exaggerated in FIG. 5.

It is evident from the above that the tube 42 is in contact with the mandrel 50 solely in the region between the groove 57 on the conical section and the groove 64 on the take-off section 53 and in the region between the groove 63 and the downstream end of the take-off section 53. The total region of contact is consequently considerably smaller than in the case of a customary expansion mandrel, and the friction between the mandrel 50 and the tube 42 is greatly reduced with respect to an installation comprising a customary mandrel.

As a result of said reduced friction, the phenomenon can be observed that the tensile force exerted on the tube by the pulling device 47 (FIG. 4) is not completely dissipated by the expansion of the tube 42 and the frictional forces which arise at the mandrel 50, but that a residual tensile force on the tube 42 remains upstream of the mandrel 50. This would result in the tube 42 being pulled from the extruder 41 with a greater speed than intended, and ultimately the tube 42 might rupture. To eliminate this undesirable effect, the tube speed control device 46 positioned between the extruder 41 and the mandrel 50 is adjusted so as to exert a braking force on the tube 42, that is to say an axial force away from the mandrel 50. Without the device 46 braking the tube 42, it can be observed that, if a mandrel 50 of the described type is used, the tube 42 is not stretched in the axial direction thereof, or at least not sufficiently. A balance therefore has to be effected between the tensile force exerted, downstream of the mandrel 50, on the tube 42 by the pulling device 47 and the axial force exerted upstream of the mandrel 50, by the tube speed control device 46. This balance is achieved by controlling the speed of both devices 46 and 47.

According to the present invention, the fluid forming a film is fed in between the tube 42 and the mandrel 50 by ducts which are formed in the mandrel and open out into the outer surface of the expansion mandrel 50, in particular on the expansion section and the take-off section thereof. This permits a considerably greater angle of the expansion section than with the method and device described in DE 23 57 210. The inventive thought for forming a fluid film between the mandrel and the tube can also be applied without the formation of the cold outer layer on the extruded tube.

In order to obtain a stable thickness of the fluid layer between the mandrel section 53 and the tube 42, preference is given to the use of a volumetric pump, i.e. a pump having a constant delivery which is independent of the fluid pressure, to circulate the fluid. A pump of this type is preferably employed to circulate the warm fluid which forms the fluid layer between the tube 42 and the mandrel section 52.

With the aid of a version, not shown in the drawing, of an expansion mandrel according to the invention, the way the tube lies against the mandrel, and consequently the frictional force occurring, can be made controllable. A mandrel suitable for this purpose may, as seen in the direction of movement of the tube along the mandrel, be provided, at a plurality of locations along the mandrel, with one or more supply orifices and/or one or more discharge orifices for the fluid which, flowing in a counter-current direction, forms a layer between the mandrel and the tube. By providing associated operable valve means for each supply and discharge orifice for the fluid it is therefore possible to adjust the location of the mandrel at which a layer of fluid between the mandrel and the tube is formed.

The above-described version of the mandrel is, in particular, also advantageous for start-up of the installation. In the course of start-up it is then possible first to extrude the tube and to pass it through the external cooling means 44 which is put into operation at that instant. Then the tube 42 is passed through the tube speed control device 46. The problem now occurs that the tube 42 must be placed over the expansion mandrel. In order to effect, initially, stable tube extrusion, the tube 42 is, in the first instance, cut open in a longitudinal direction behind the device 46, so that the tube need not yet be placed around the mandrel. As soon as the longitudinal cut is no longer applied, the tube will reach the mandrel with a tube wall which is closed in a circumferential direction. At that instant it is not yet possible, by means of the expansion mandrel 50 represented in FIG. 5, to produce a fluid layer between the tube and the mandrel 50. Nor can use be made of the pulling device 47 in order to force the tube 42 over the mandrel 50. Therefore, the tube speed control device 46 is now adjusted in such a way that it pushes the tube 42 in the direction of the mandrel 50 and therefore thrusts the tube over the mandrel 50.

If, instead of the mandrel 50, use is made of the above-described version of the expansion mandrel it is always possible for a layer of fluid to be formed at the point where the tube is already lying around the mandrel, as a result of which the friction between the tube and the mandrel is eliminated or reduced. This therefore means that during the process of the tube being forced over the mandrel when the installation is started up, the supply of the fluid forming a film or layer at all times takes place at a point of the mandrel which lies further downstream.

As can be seen in FIG. 5, the tube 42 is also cooled externally, after the orientation in the circumferential direction by the expansion mandrel 50 has been effected. A cooling means 70 is provided to achieve said external cooling.

A plate 75 comprising a sizing orifice through which the tube 42 passes is set up downstream of the mandrel 50. The plate 75 is movable with respect to the mandrel 50, as indicated by arrow E in FIG. 5. Downstream of the plate 75 a measuring device 80 is set up, which device 80 can establish the wall thickness and the shape of the cross-section of the tube 42 passing through the device 80.

The signal which represents the measurements from the device 80 is fed to a control device 81 which compares said signal with the desired tube dimensions. Based on this comparison the position of the plate 75 with respect to the mandrel can be controlled. The same comparison is also used to control the operation of the heating means 48.

It will be evident that use of the inventive thought can also be made for the sealing means 59 and 67, for example by employing a closing means of the type as described with reference to FIG. 2. Likewise it is possible for the ducts 65 not to be connected to the space 66, but to be passed to the outside via a separate conduit through the anchor member 51.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. Method for treating an extruded hollow plastic section which emerges in an extrusion direction from an extruder head connected to an extruder, said extruder head having a mandrel which forms a hollow space in said plastic section, wherein, downstream of said extruder head, a plurality of spaced apart closing means are kept stationary with respect to said extruder in said hollow space of said extruded plastic section, at least one sealed compartment being formed between two adjacent closing means, and wherein a section treatment medium is fed to said at least one sealed compartment for treating said plastic section, at least one of said closing means having a dimensionally rigid outer wall, said outer wall having such dimensions with respect to said hollow space of said extruded plastic section that said plastic section tends to frictionally engage said outer wall of said closing means, said closing means comprising first conduit means which open out into at least one supply orifice which is provided in said outer wall of said closing means, said first conduit means being connectable to fluid feeder means for feeding fluid to said first conduit means, and second conduit means being provided which connect to at least one discharge orifice for discharging said fluid, said discharge orifice being situated upstream of said supply orifice, wherein said fluid is forced between said outer wall of said closing means and said plastic section, such that said fluid forms a fluid film between said plastic section and said outer wall between said supply orifice and said discharge orifice, said fluid being passed countercurrent to said extrusion direction of said plastic section, between said closing means and said plastic section.

2. Method according to claim 1, wherein at least two sealed compartments are formed in the hollow space of said plastic section, and each of said sealed compartments is fed with a separate stream of section treatment medium.

3. Method according to claim 1, wherein at least two sealed compartments are formed in the hollow space of said plastic section, and each of said sealed compartments is fed with a separate stream of cooling water.

4. Method according to claim 1, wherein a plurality of spaced apart closing means are provided in said hollow space of said extruded plastic section, at least one sealed compartment being formed between two adjacent closing means, and wherein said plastic section, is treated externally while said plastic section is passing a sealed compartment in said hollow space of said plastic section.

5. Method according to claim 1, wherein a plurality of spaced apart closing means are provided in said hollow space of said extruded plastic section, at least one sealed compartment being formed between two adjacent closing means, and wherein a fluid at an elevated temperature is fed to said one sealed compartment for the internal treating of said plastic section.

6. Method according to claim 1, wherein the temperature of the fluid forced between a closing means and said plastic section is lower than the temperature of a section treatment medium fed to a sealed compartment present upstream of said closing means.

7. Method according to claim 1, wherein an upstream compartment and a downstream compartment are provided in said hollow space of said extruded plastic section sealed by a plurality of closing means, and wherein the temperature of a section treatment medium fed to said upstream compartment is higher than the temperature of a section treatment medium fed to said downstream compartment.

8. Installation for extruding a hollow plastic section, said installation comprising an extruder, an extruder head connected to said extruder and having a mandrel for forming a hollow space in said extruded plastic section which emerges from said extruder head in an extrusion direction, said installation further comprising a plurality of spaced apart closing means for forming at least one sealed compartment, said closing means being held inside said hollow space of said extruded section, a distance downstream of said extruder in said extrusion direction, for sealing said hollow space of said extruded section, wherein said installation has, for each sealed compartment, a medium circulation means for feeding a medium to said compartment and for discharging said medium from said compartment, at least one of said closing means having a dimensionally rigid circumferential wall, said circumferential wall having such dimensions with respect to said hollow space of said extruded plastic section that, during operation of said extrusion installation, said plastic section tends to frictionally engage said circumferential wall of said closing means, said closing means comprising first conduit means which opens out into at least one supply orifice which is provided in said circumferential wall of said closing means and second conduit means which connect to at least one discharge orifice, said installation further comprising fluid feeder means for feeding fluid to said first conduit means, wherein at least one discharge orifice is situated upstream of said at least one supply orifice, and wherein said fluid feeder means is adapted to form a film of fluid between said circumferential wall of said closing means and said plastic section, said fluid in said fluid film flowing opposite to said extrusion direction of said plastic section.

9. Installation according to claim 8, wherein said closing means is an expansion mandrel for circumferentially expanding said extruded plastic section, said expansion mandrel comprising at least one portion having a transverse cross-section increasing in said extrusion direction for expanding said plastic section moving along said expansion mandrel.

10. Installation according to claim 8, wherein said closing means is an expansion mandrel for circumferentially expanding said extruded plastic section, said expansion mandrel comprising a first portion having a transverse cross-section increasing in said extrusion direction for expanding said plastic section moving along said expansion mandrel, and a second portion connected thereto downstream in said extrusion direction and having an essentially uniform transverse cross-section, said at least one supply orifice and said at least one discharge orifice for said film-forming fluid being provided in said circumferential wall of said second portion of said expansion mandrel.

11. Installation according to claim 8, wherein said closing means is an expansion mandrel for circumferentially expanding said extruded plastic section, said expansion mandrel comprising a first portion having a transverse cross-section increasing in said extrusion direction for expanding said plastic section moving along said expansion mandrel, and a second portion connected thereto upstream in said extrusion direction and having an essentially uniform transverse cross-section, said at least one supply orifice for said film-forming fluid being provided in said first portion of the expansion mandrel and said at least one discharge orifice being situated upstream, in said extrusion direction, of said first portion of said expansion mandrel.

* * * * *